Jan. 6, 1931.  W. M. ZAIKOWSKY  1,788,076
INTERNAL COMBUSTION ENGINE
Filed May 19, 1924
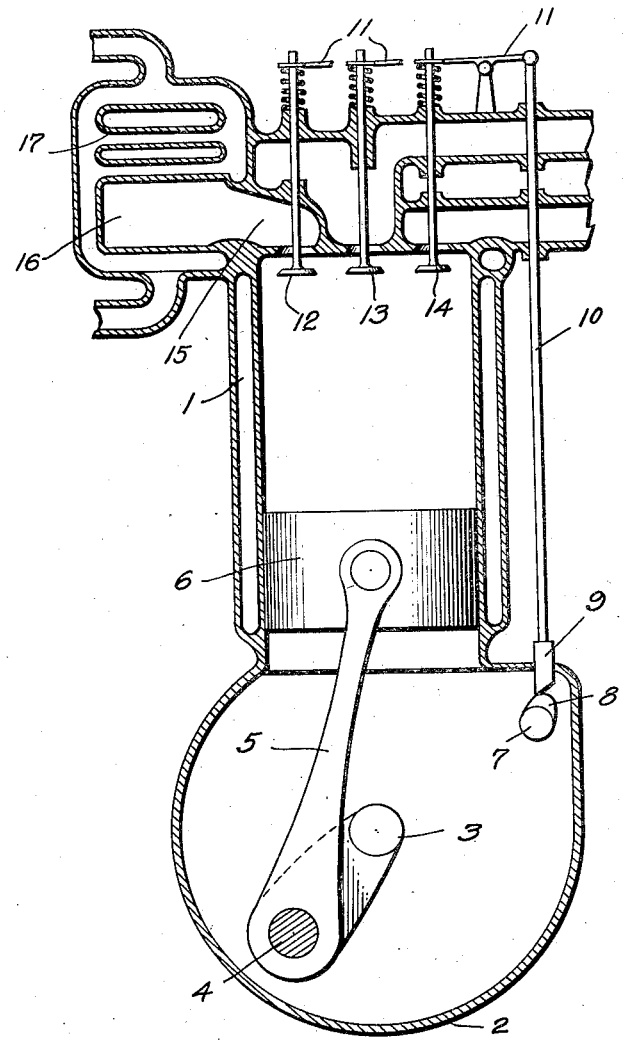

Patented Jan. 6, 1931

1,788,076

UNITED STATES PATENT OFFICE

WLADIMIR MICHEL ZAIKOWSKY, OF PASADENA, CALIFORNIA, ASSIGNOR TO STANDARD OIL DEVELOPMENT COMPANY

INTERNAL-COMBUSTION ENGINE

Application filed May 19, 1924. Serial No. 714,263.

My invention relates to improvements in internal combustion engines and will be fully understood from the following specification taken in connection with the appended drawing, which illustrates diagrammatically a single cylinder engine constructed and operating in accordance with the invention. In the drawing, the numeral 1 designates the cylinder of the engine; 2 designates the crankcase; 3 the crankshaft; 4 the crank; 5 the connecting rod; and 6 the piston. A camshaft, designated 7, is driven by timing gears, not shown, from the crankshaft and carries three cams, one only of which is illustrated, designated 8. Tappets 9 are actuated by the cams 8 and in turn operate pushrods 10, of which there is one for each valve. The pushrods are connected at their upper ends to the rocker arms 11, which directly actuate the valves.

The parts so far described are of the ordinary construction commonly employed in internal combustion engines, such as those used in automobiles. The engine illustrated is of the valve-in-the-head type, but in place of being equipped with two valves, one for the inlet and one for the exhaust, is equipped with three valves, designated 12, 13, and 14. Valve 14 is the exhaust valve, opening into the exhaust passage in the usual way. Valve 13 is the intake valve, opening into the intake pipe, and through the latter communicating with the carbureter, as in ordinary practise. Valve 12 communicates through a passage 15 with a compression chamber 16. The passage 15 has one wall in common with the intake passage, through which wall the stem of the valve 12 passes, as illustrated. The purpose of this construction is to conserve any gases which may leak around the valve stem, by permitting them to pass directly into the intake passage instead of going to atmosphere. The compression chamber 16 is water-jacketed in the same manner as the cylinder and cylinder-head, and is furthermore provided with additional cooling in the form of transverse tubes 17, crossing the chamber and communicating at their ends with the jacket space. The engine is equipped with the usual ignition mechanism of any approved form, such as a high-tension spark plug, not shown, and with an approved carbureter or mixer, to provide an explosive mixture of air and gaseous, vaporized, or atomized fuel.

The engine constructed as above described may be assumed to have a compression ratio of 10 to 1; and the compression chamber a volume equal to that of the displacement of the piston. No attempt has been made to illustrate these proportions in the drawings, which are to be regarded as diagrammatic only. The operating cycle of the engine is as follows:

On the intake stroke, valves 12 and 14 are closed and as the piston moves downwardly on this stroke the charge of explosive mixture is drawn into the cylinder. At or about lower dead center of the piston 6 on the intake stroke—somewhat later in the case of high-speed engines, as is common practise— the intake valve 13 closes. Shortly after the closing of valve 13, i. e., from 5 to 20 degrees thereafter on the compression stroke of the piston, the compression chamber valve 12 opens and remains open until the piston is at or beyond the mid-point of its compression stroke. At a point which will generally lie between the approximate mid-stroke of the piston and the point at which ignition occurs, and in any event several degrees before the latter, valve 12 closes. That is, the valve should close soon enough so that ignition cannot spread back into the compression chamber. In other words, it should close before complete inflammation of the charge. The piston completes its compression stroke, ignition takes place, and the working stroke occurs as in ordinary practise with four cycle engines, all valves remaining closed. At or shortly before bottom dead center on the working stroke, the exhaust valve 14 opens and remains open through the exhaust stroke, all as in ordinary practise. This completes the cycle.

It will be apparent that in the foregoing cycle the compression chamber 16 will contain either air or explosive mixture at approximately atmospheric pressure when the engine is first placed in operation. On the first compression stroke, as above described, a charge of explosive mixture will be forced by the piston through the open valve 12 and trapped therein under some pressure at the time of the closing of this valve. During the ensuing working, exhaust, and intake strokes, this charge under pressure within the compression chamber 16 will undergo cooling by its contact with the water-jacketed walls and additional cooling surfaces provided for that purpose in the form of the tubes 17. Such cooling will of course tend to lower the pressure in the chamber 16. On the opening of the valve 12 on the next succeeding compression stroke, the entrapped cooled charge from the compression chamber 16 will flow back into the cylinder 1 from the compression chamber, there to mix with the last inspired charge of explosive mixture, establishing practically instantaneously uniform pressure in excess of atmospheric in the chamber 16 and the cylinder 1. Continuing the compression stroke, there will be a return flow of mixture from the cylinder back into the compression chamber 16, and on the conclusion of this second compression stroke the charge trapped within the compression chamber 16 will be at a higher pressure than on the first stroke. The process above described continues for the first few cycles of the engine, at the end of which time the equilibrium or normal operating condition is reached, with a cycle operating as follows: On the opening of the compression chamber valve 12, the trapped and cooled mixture within the compression chamber, under a pressure varying between 5 and 10 atmospheres (depending upon the timing of the valve 12 and upon the efficiency of the cooling action of the compression chamber), enters the cylinder 1, immediately filling that chamber with an explosive charge at a pressure of two-and-one-half to five atmospheres, or thereabouts, and at a temperature, for example, of 212° F. During the succeeding portion of the compression stroke up to the time of closing of valve 12, this charge is compressed, the amount of compression representing the ratio between the displacement of the piston and the sum of the volumes of the compression chamber and the space above the piston in the cylinder. After the compression chamber valve 12 closes, the remaining movement of the piston before ignition occurs takes place under the usual conditions of internal combustion engine operation, i. e., a close practical approach toward adiabatic compression. It is to be noted, however, that up to the time of closing of the valve 12 of the compression chamber, the compression stroke is essentially isothermal, rather than essentially adiabatic.

The cycle as described in the foregoing may therefore be set out substantially as follows:

1. Intake stroke—under normal conditions.
2. Compression stroke—first part substantially isothermal; second part substantially adiabatic.
3. Working stroke—as in normal practise.
4. Exhaust stroke—as in normal practise.

The cycle as above described permits the use of compression ratios considerably exceeding those obtainable on ordinary hydrocarbon fuels, such as light petroleum distillates, without detonation. By virtue of this permissible increase in compression ratio obtainable without detonation, there is a net increase in efficiency of the engine and a net gain in power produced for equivalent piston displacement at the same operating speed. It is recognized that the cycle above described entails a necessary theoretical loss of efficiency by resorting to isothermal compression, but the gain in efficiency resulting from the increased compression ratios thereby obtainable considerably exceeds this loss.

It is also to be noted that the compression chamber, arranged and constructed as described, provides an additional time element for the complete vaporization of an atomized mixture, and that it is permissible to maintain a higher cylinder wall temperature without detonation, thus tending to reduce heat loss through the cylinder wall during the working stroke.

Although the invention has been illustrated and described as applied to a single cylinder vertical four-cycle engine of conventional type, it will be understood that the principles of the same are applicable to all common varieties of single and multiple cylinder two-cycle and four-cycle engines. In the case of multiple cylinder engines, individual compression chambers for each of the cylinders may be used or a common compression chamber may be used for all cylinders, with individual valve connections, as illustrated herein, leading to each cylinder. Where liquid fuel is used which does not vaporize completely or readily, it may be advantageous to mount the compression chamber vertically above the cylinder, as illustrated herein, to prevent the trapping of unvaporized liquid particles in the same. This construction is a matter of convenience, however, and need not be followed where the difficulty referred to is not encountered or is not serious.

An engine operating under the foregoing cycle may be governed or regulated by the usual throttling method, or if higher efficiencies under light load conditions are desired it may be advantageously governed by changing the mixture proportions. This latter method of governing, which is in itself well known, is particularly well suited to the cycle described by reason of the fact that the temperature of the charge at the time of ignition is readily controllable within wide limits. Such control may be obtained by varying the timing of the valve 12, as by means of a longitudinally adjustable operating cam the surfaces of which are machined to give varying valve timing for different longitudinal adjustments. Such mechanism in itself forms no part of my present invention and is well understood in the art and therefore not illustrated.

It has been heretofore recognized that relatively lean mixtures may be ignited and burned if raised to a high temperature before ignition. This effect of gain by reducing the cooling influence of the compression chamber on the charge during compression through a shorter period of opening of the valve 12. The limit of this regulation is not reached until the valve 12 remains closed throughout the cycle, in which event the compression stroke takes place under the normal essentially adiabatic conditions, giving a maximum temperature of the charge at the time of ignition. In the case of engines of high compression ratio to which my cycle is especially adapted, the temperatures thus attained are sufficient to permit of governing by mixture proportioning down to exceedingly lean mixtures.

By this method of control, i. e., reducing the richness of the mixture and simultaneously increasing the temperature of the charge at the time of ignition, an engine operating on the cycle herein described may maintain a reasonably high thermal efficiency under light loads as well as at full load.

While I have described a certain timing of the compression chamber valve, i. e., opening of the valve shortly past bottom dead center and closing between mid-stroke and top dead center, it will be understood that this timing may be bettered in individual cases. For example, the valve may be timed to be open during the mid-portion only of the stroke, or during the latter portion only. The optimum timing will depend upon the characteristics of the engine. In all cases the principle remains identical however, i. e., that there is obtained a temperature of the compressed charge lower than that which would be obtained for the same compression ratio, without the use of compression chamber and timed valves.

What I claim is:

1. The combination with an internal combustion engine of the four-stroke cycle type having a cylinder and piston for compressing a combustible charge, of a compression chamber of constant volume connecting only with the cylinder above the piston, a valve controlling said connection, means for cooling the gaseous contents of said compression chamber, and means for opening the said valve during the compression stroke of the engine and for closing the said valve before ignition can spread into the compression chamber.

2. The method of operating an internal combustion engine of the type in which each compression stroke immediately precedes an explosion stroke, consisting of withdrawing part of the charge during each compression stroke, cooling said part withdrawn, and introducing it into a cylinder during a later compression stroke.

3. The method of operating an internal combustion engine of the type in which each compression stroke immediately precedes an explosion stroke, consisting of withdrawing part of the charge during each compression stroke, cooling said part withdrawn, and introducing it into the cylinder during its next compression stroke.

4. In an internal combustion engine of the type in which each compression stroke immediately precedes an explosion stroke, a cylinder, a piston operable therein, a compression chamber adjacent said cylinder and connected thereto, means for passing a part of the charge in the cylinder into said chamber in the same manner during each compression stroke of the piston and for returning part of the charge in the compression chamber to the cylinder during the next compression stroke.

5. An internal combustion engine of the type in which each compression stroke immediately precedes an explosion stroke, having a cylinder and a piston for compressing a combustible mixture and having a compression ratio greater than three-to-one, a compression chamber communicating only with the cylinder of the said engine above the piston and having a volume relatively large as compared with the clearance volume of the cylinder, means for cooling the said compression chamber, and means operating in the same manner during each compression stroke for opening communication between the compression chamber and the cylinder during the first half of the stroke and closing said communication before ignition can spread into the compression chamber.

6. The method of operating an internal combustion engine of the type in which each compression stroke immediately precedes an explosion stroke, which consists in carrying on the compression of the explosive mixture during the first part of each compression stroke under substantially adiabatic conditions, during the second part thereof under substantially isothermal conditions and during the third part under substantially adiabatic conditions, whereby there is obtained a relatively low temperature of the compressed charge for any given compression ratio, and igniting and expanding the mixture during the next succeeding expansion stroke under the usual substantially adiabatic conditions.

7. The method of operating an internal combustion engine of the type in which each compression stroke immediately precedes an explosion stroke, consisting of compressing the charge during each compression stroke in a volume larger than the cylinder by segregating a portion of the charge from the clearance space, and introducing a part of said charge so segregated into said cylinder on the next compression stroke.

8. The method of operating an internal combustion engine of the type in which each compression stroke immediately precedes an explosion stroke, consisting of compressing the charge during each compression stroke in a volume larger than the cylinder by segregating a portion of the charge from the clearance space, cooling the charge, and introducing a part of said charge so segregated into said cylinder on the next compression stroke.

9. The method of operating an internal combustion engine of the type in which each compression stroke immediately precedes an explosion stroke, consisting of withdrawing a part of the charge during each compression stroke, cooling said part withdrawn, and introducing into the cylinder during each compression stroke a cooled charge of substantially the same amount and composition as the part withdrawn.

10. In an internal combustion engine of the type in which each compression stroke immediately precedes an explosion stroke; a cylinder; a piston operable therein; a compression chamber adjacent said cylinder and connected thereto; means for passing a part of the charge in the cylinder into said chamber in the same manner during each compression stroke of the piston and for returning part of the charge in the compression chamber to the cylinder during the next compression stroke; and means for cooling the contents of the compression chamber.

WLADIMIR MICHEL ZAIKOWSKY.